INVENTOR: GERALD A. GARRY
BY Homer L. Kneal
AGENT

Oct. 6, 1970 G. A. GARRY 3,533,069

CHARACTER RECOGNITION BY CONTEXT

Filed Dec. 23, 1966 2 Sheets-Sheet 2

United States Patent Office 3,533,069
Patented Oct. 6, 1970

3,533,069
CHARACTER RECOGNITION BY CONTEXT

Gerald A. Garry, Rochester, Minn., assignor to International Business Machines Corporation, Armonk, N.Y., a corporation of New York Filed Dec. 23, 1966, Ser. No. 604,296
Int. Cl. G06k *9/00*
U.S. Cl. 340—146.3 12 Claims

ABSTRACT OF THE DISCLOSURE

Trial characters—candidates for identifying unknown scanned characters—are stored in character registers according to whether they are first, second or third choice characters. A magnetic drum reads out character choice combinations. These combinations are used to gate trial characters from the character registers in order to form trial words. The trial words are compared with reference words in a drum dictionary. If a counterpart reference word is found in the dictionary for the trial word, the counterpart reference word may be stored in an output register. Whether or not the counterpart reference word will be stored in the output register depends upon whether or not a comparator detects that the counterpart reference word's probability factor weighted by the trial word priority is greater than the priority weighted probability factor of a previous counterpart reference word stored in the output register.

BACKGROUND OF THE INVENTION

This invention relates to apparatus for recognizing conflicting characters by use of context. More particularly, the invention relates to apparatus for selecting a best guess word from trial words formed from trial characters having associated priorities, i.e., first, second or third choice trial characters.

The use of context in character recognition has been rapidly developing in recent years. Context character readers are generally superior to other character readers because they base their character recognition decisions on characters surrounding the character to be identified as well as measurements taken on the character itself.

One method used in context decisions is referred to as the dictionary method. This method is implemented by using a dictionary of words with probability factors associated with each word. The unknown word read by the machine is compared with all reference words having the same number of characters. During each comparison, the reference word probability factor is weighted by a probability factor for each character in the unknown word. This character probability factor amounts to the probability that the character read by the machine has been confused with the character in the same character position in the reference word. A joint probability is then computed based upon the probability of the reference word and the confusion probabilities of each character in the unknown word. This is repeated through the dictionary of words and the reference word with the highest joint probability factor is selected as being the best guess identification of the word read by the character reader.

The difficulty with the above prior art context decision apparatus is that it does not make use of all the information available in character readers. Many character readers today have the capability of indicating multiple choices for the same pattern being read by the machine. Furthermore, these machines have the capability of indicating first choice, second choice, third choice, etc. for the conflicting characters recognized from the same pattern. This character choice information is very useful to context decision. The character reader is effectively saying that, irrespective of confusion probabilities, based upon its measurements it believes the character pattern is most likely a first choice character, but it may be the second choice character or even possibly a third choice character. In other words, the character reader is specifying its confidence of decision by indicating priorities of character choices. These priorities have no relationship to the probability that one character was recognized as another character. The priorities simply represent the best guesses made by a character reader based upon its measurements of the pattern.

Another difficulty with the prior art dictionary look-up system is that a single trial word is compared with all the permutations and combinations of alphabetic characters which could make up a reference word having the same number of letters. This requires a large dictionary look-up system. Again, the fault with this approach is that it ignores the priority information available from the character reader. In other words, the prior art context apparatus makes more word comparisons than it would need to if it made use of the character priority information from the character reader.

SUMMARY OF THE INVENTION

It is an object of this invention to make a best guess identification of words by weighting word probability factors by the priorities associated with trial characters in the word.

It is another object of this invention to form trial words according to the character priority combinations.

The objects of this invention are accomplished by comparing each trial word with reference words to detect counterpart reference words identical to the trial words. Furthermore, the trial words have associated with them a word priority factor while the reference words have associated with them a word probability factor. After all comparisons are made, a best guess identification of the word is made by weighting the probability factor of each counterpart reference word with the word priority factor of its counterpart trial word and by selecting the counterpart reference word with the highest priority weighted probability factor.

Another feature of the invention, the formation of trial words according to priority of the trial characters, is accomplished by generating character priority combination signals and using these signals in parallel to gate out trial characters from priority character registers. The trial words formed will have an associated trial word priority factor based upon the character priority combination.

The advantage of the invention is that it uses the character priority information available from character readers to simplify the context decision process. Instead of calculating confusion probabilities as was done in the prior art, the character priorities may simply be assigned weights for weighting the reference word probability factor from the dictionary. In addition, instead of having to store all possible combinations of alphabetic characters for reference words, the invention only forms trial word combinations for the various trial characters specified by the character reader. This latter advantage greatly reduces the size of the reference word dictionary and shortens the search time for finding the best guess word. The foregoing and other objects, features and advantages of the invention will be apparent from the following more particular description of the preferred embodiment of the invention, as illustrated in the accompanying drawings.

DESCRIPTION

Figure 1A:
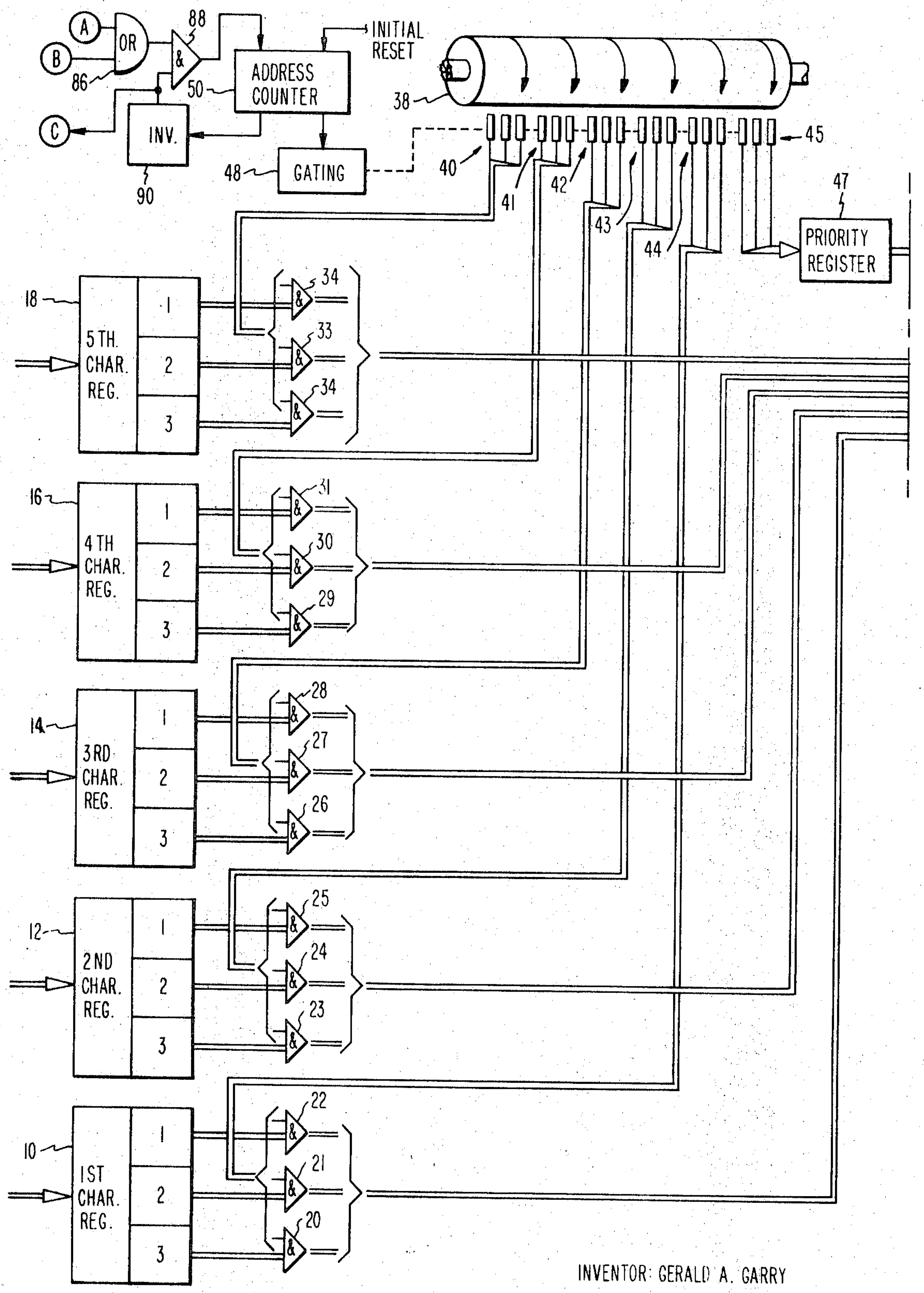
FIGS. 1*a* and 1*b* show a logic block diagram for a preferred embodiment of the invention.
Figure 1B:
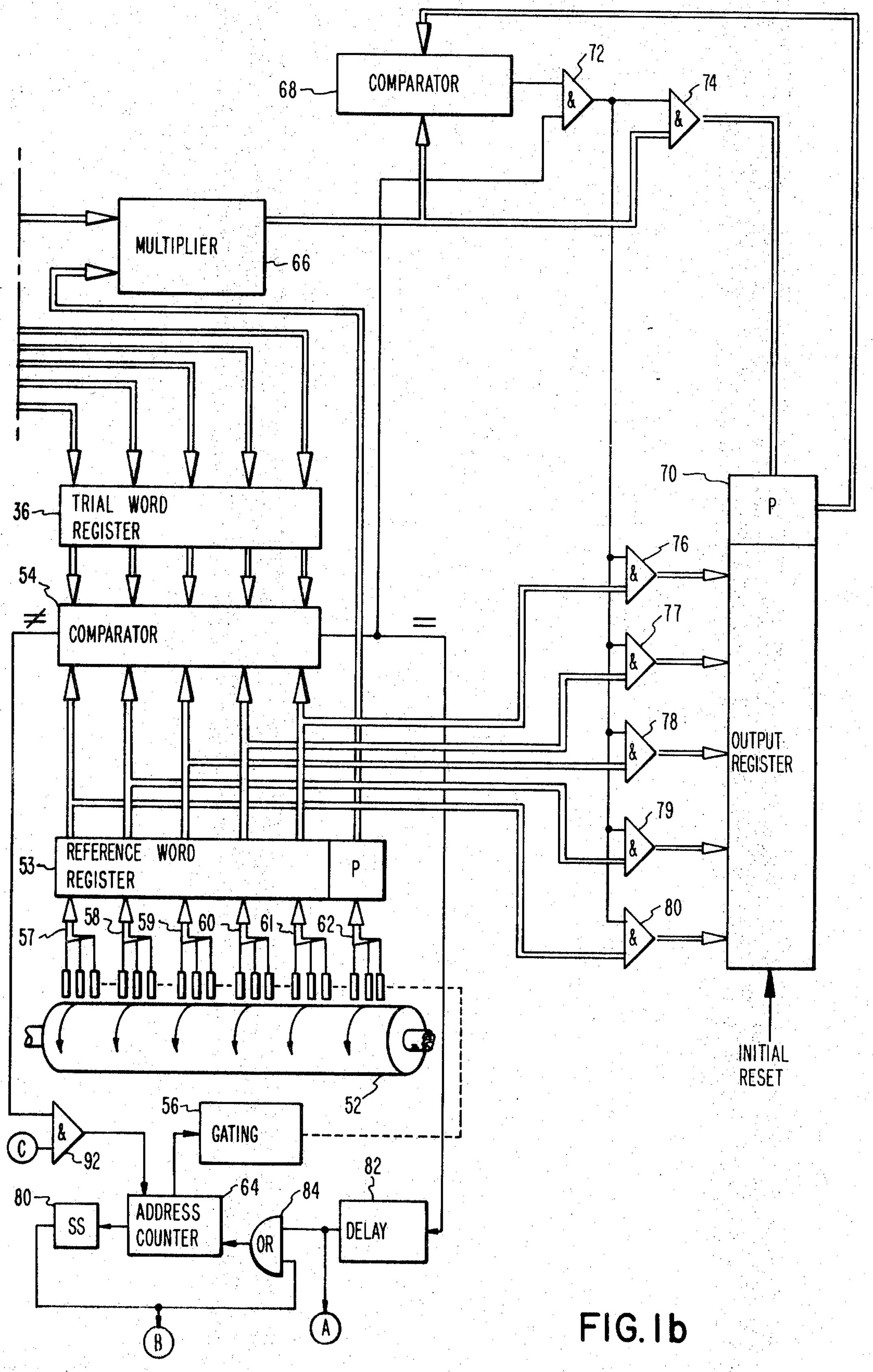

Now referring to FIGS. 1*a* and 1*b*, the input trial characters used in the invention are stored in the character registers 10, 12, 14, 16 and 18. Each register can store three characters in order of priority. Each of the character registers is in fact three parallel registers with gates to store the characters received according to priority. For example, in the first character register 10, the top priority character would be gated into an internal register indicated in the drawing as being register #1. Similarly, second and third priority characters received would be gated into internal registers 2 and 3 respectively. All of the other character registers 12, 14, 16 and 18 operate in the same manner so that each character register in effect stores a first choice character, a second choice character and a third choice character. The feeding of these trial characters to the character registers is done by a character reader which has the ability to assign a choice preference or priority to conflicting characters. For example, assume a character reader in scanning a character pattern indicates the pattern could be an A, an H or an F. Furthermore, the character reader indicates that from its measurements, it believes the best choice is H, the second choice is A and the third choice is F. These trial characters would then be gated into one of the character registers 10, 12, 14, 16 or 18 depending upon whether they are 1st, 2nd, 3rd, 4th or 5th character in the word. Furthermore, in the appropriate character register, the characters would be positioned in the internal registers 1, 2 and 3 in the sequences H, A and F respectively.

To form trial words from trial characters, character priority combinations are gated by AND gates 20–34 to trial word register 36. AND gates 20–34 are controlled by signals from magnetic drum 38 so that only one AND gate in each set of three, 20–22, 23–25, 26–28, 29–31, and 32–34 is conditioned to pass a trial character to the trial word register 36 at a given time.

Most of the AND gates in the figures are indicated with one input being a single line and the other input being a cable of multiple lines. This representation is used as a shorthand for multiple AND gates. In effect, because a digital system is shown, each character would have a number of parallel lines over which its digital bits pass. Therefore, it would be necessary to have an AND gate for each bit of the character. For clarity instead of showing many AND gates, a single AND gate has been used with a cable input and a cable output. The function of the AND gate is to pass all of the digital bits representing a character when the single line input to the AND gate conditions the gate to pass the character.

The function of magnetic drum 38 is to generate the character priority combinations which control the AND gate 20–34 and thereby form trial words. One track on the magnetic drum is assigned to each of the AND gates 20–34. Therefore, three tracks of the drum are used to store the priority gating conditions for each of the character registers 10, 12, 14, 16 and 18. Thus, a total of 15 tracks are used to gate out the character registers. In addition, three more tracks are used to store the digital indication of the priority factor for the character priority combination used to form the trial word. Transducers 40, 41, 42, 43 and 44 control the AND gates associated with character registers 18, 16, 14, 12 and 10 respectively Transducers 45 read out the priority factor for each trial word formed and this trial word priority is stored in priority register 47.

To gate the transducers 40–45 in synchronism with the rotating drum 38, gating signal generator 48 is provided. The gating generator 48 gates a pulse in accordance with the address stored in address counter 50. An address in counter 50 specifies a character priority combination in drum 38 and thereby specifies a trial word. The address counter 50 is initially preset to an address specifying the first trial word. After each trial word has been processed, the address is advanced a single count to gate out the next trial word.

As previously pointed out, trial words formed by the magnetic drum 38 gating AND gates 20–34 are stored in trial word register 36. Trial words in register 36 are then compared with dictionary words from magnetic drum 52 by comparator 54. Reference words from the drum dictionary 52 are gated to the reference word register 53 by gating signal generator 56 which conditions transducers 57, 58, 59, 60 and 61. The gating of the dictionary word is specified by the address in address counter 64. The address counter 64 is initially preset to a count to specify the address of the first dictionary word in the magnetic drum 52. After each comparison in comparator 54, the address counter 64 is then advanced a single count to specify the next word.

The words in drum 52 also have an associated probability factor stored with each word. This probability factor is read out by transducers 62 which are gated at the same time as the word is gated from the drum by gating signal generator 56.

To weight the probability factor of a reference word in register 53 with the trial word priority factor from register 47, multiplier 66 is provided. Multiplier 66 multiples the reference word probability factor by the trial word priority factor to obtain a priority weighted probability factor. The purpose of weighting the reference word probability factors is to give more emphasis to trial words made up of high priority choice characters. In other words, a trial word made up of all first choice characters should have stronger emphasis than a trial word made up of all second choice characters or all third characters or any combination thereof.

The priority weighted probability factor from multiplier 66 is compared by comparator 68 with the priority weighted probability factor of a previous reference word stored in output register 70. The reference word in output register 70 is a previous reference word which was the counterpart of a previous trial word. The priority weighted probability factor of this previous counterpart reference word is also stored in the output register 70.

To gate a new reference word from the reference word register 53 into the output register 70, the reference word must be a counterpart to the present trial word and it must have a priority weighted probability factor which is higher than the probability factor stored in the output register 70. AND gate 72 is conditioned by concurrent outputs from comparator 54 and comparator 68. Comparator 54 has an output if the reference word in register 53 is the counterpart of the trial word in register 36. Comparator 68 has an output if the priority weighted probability factor from multiplier 66 is higher than the priority weighted probability factor from output register 70. To summarize, AND gate 72 will generate an up signal for a reference word which is the counterpart of the trial word in register 36 if the priority weighted probability factor of the reference word is higher than the priority weighted probability factor of a previous counterpart reference word stored in the output register 70.

The output pulse from AND gate 72 conditions AND gate 74 to update the probability stage of output register 70 with the priority weighted probability factor of the present counterpart word. Similarly, the output pulse from AND gate 72 conditions AND gates 76, 77, 78, 79 and 80 to update the output register 70 with the present counterpart reference word.

To control the advancing of address counters 50 and 64 so as to form trial words and so as to search the dictionary, the equality signal is passed from comparator 54 to delay line 82. The purpose of delay line 82 is to permit comparator 68 and AND gate 72 sufficient time to gate counterpart reference words into the output register 70. The delayed equality signal from delay line 82 is passed by OR gate 84 to address counter 64 to present the address counter back to the first address of the reference words in the dictionary. Simultaneously, the delayed equality signal is passed by the OR gate 86 and AND gate 88 to advance address counter 50 by one count. The The address in counter 50 then gates out from drum 38 the next character priority combination to form the next trial word.

As shown in FIGS. 1*a* and 1*b*, the OR gates 84 and 86 are also responsive to a signal from address counter 64. This signal from address counter 64 indicates the address of the last reference word in dictionary 52 has been reached. In this event, it is necessary to preset the address counter 64 back to the first reference word address and also to advance the address counter 50 to the next trial word address. Single shot 89 and OR gates 84 and 86 accomplish these functions.

To control the searching of the dictionary, the inequality signal is passed from comparator 54 to AND gate 92 During searching, AND gate 92 is conditioned to pass the inequality signal to the address in counter 64. The inequality signal then advances the address counter one count to the address of the next reference word. The conditioning signal for AND gate 92 is from inverter 90 which in turn receives a signal from address counter 50. This signal from address counter 50 is indicative that the counter has gone past the address of the last trial word. Therefore, inverter 90 inverts this signal and thereby inhibits AND gates 88 and 92 so that the address in counters 50 and 64 are no longer advanced. The inhibit signal disappears when the system is again initialized by presetting address counter 50 to the first trial word address.

OPERATION

As an example of operation, assume a character reader has supplied the character registers 10, 12, 14, 16 and 18 with trial characters according to priority. The following table shows the contents of the character registers for the example to be discussed.

| Choice | 1st char. | 2nd char. | 3rd char. | 4th char. | 5th char. |
|---|---|---|---|---|---|
| 1st | S | M | E | L | L |
| 2nd | E | W | A | I | C |
| 3rd | B | N | F | C | T |

Many trial words can be formed from these trial characters. However, not all of the trial words will represent actual words in the English language. It will be assumed that the reference words in the dictionary represented by magnetic drum 52 will be English words. Furthermore, the probability factor for these English words will be based upon the frequency of usage. For example, suppose the probability factors are based upon the usage of words in a maritime vocabulary or oceanographic vocabulary. The following table of sample reference words in the dictionary has probability factors assuming such an oceanographic context. These reference words are words that can be made up from the trial characters shown and therefore, represent a very limited sample of all the reference words that would be stored on the magnetic drum 52.

SAMPLE REFERENCE WORDS

| Word: | Probability |
|---|---|
| ENACT | .2 |
| SMELL | .2 |
| SMALL | .3 |
| SNAIL | .6 |
| SMELT | .7 |
| SWELL | .8 |

Finally, before proceeding with the operation, in this example the pattern of information stored in the magnetic drum 38 is examined. As previously pointed out, magnetic drum 38 stores the character priority combinations which are used to form the trial words. In addition, each character priority combination has associated with it a word priority factor. In the following table, this priority factor was simply calculated by multiplying an assigned priority weight for each character priority in the character priority combination. It has been assumed herein that the priority weight for a first choice character would be 1.0. For a second choice character would be .9, and for a third choice character would be .8. As an example, in the following table, the priority combination second, first, third, first, first, has a word priority of .7 arrived at by multiplying $.9\times1\times.8\times1\times1$ and rounding off to the most significant digit. The following table shows a few of the many character priority combinations stored in the magnetic drum 38. The drum, of course, contains all of the combinations which can be made up of five characters having three choices per character.

CHARACTER PRIORITY COMBINATIONS

| 1st char. | 2nd char. | 3rd char. | 4th char. | 5th char. | Word priority |
|---|---|---|---|---|---|
| 1st | 1st | 1st | 1st | 1st | 1.0 |
| 2nd | 1st | 1st | 1st | 1st | .9 |
| 1st | 2nd | 1st | 1st | 1st | .9 |
| 1st | 1st | 2nd | 1st | 1st | .9 |
| 1st | 1st | 1st | 2nd | 1st | .9 |
| 1st | 1st | 1st | 1st | 2nd | .9 |
| 2nd | 2nd | 1st | 1st | 1st | .8 |
| 2nd | 1st | 2nd | 1st | 1st | .8 |
| . | . | . | . | . | . |
| 2nd | 1st | 3rd | 1st | 1st | .7 |
| . | . | . | . | . | . |
| 2nd | 3rd | 2nd | 3rd | 2nd | .5 |
| . | . | . | . | . | . |
| 3rd | 3rd | 3rd | 3rd | 3rd | .3 |

It will be appreciated by one skilled in the art that different word priorities could be assigned for the character priority combinations. Generally, though, the word "priority" should decrease as the number of second and third choice characters used in the trial word increase. Likewise, the probability factor stored with the reference words in the dictionary magnetic drum 52 can be based upon usage in the language, usage in particular context or frequency of combination of letters in the reference word or in any other probability relationship which best fits the context being machine read.

To begin the operation wtih this example, the address counters 50 and 64 are initially preset to the address specifying the first character priority combination and the first word in the dictionary. The first character priority combination from magnetic drum 38 then operates AND gates 20–34 to gate out the first choice character from each of the character registers 10, 12, 14, 16 and 18. These first choice characters are stored in the trial word register and form the word SMELL.

Comparator 54 compares the word SMELL with the first word in the dictionary 52. It is assumed that the dictionary contains words in order of probability and accordingly, the word SMELL would not be matched by the first word. Address counter 64 is then advanced one count because comparator 54 did not indicate any comparison. The next word in magnetic drum 52 is compared with the word SMELL. This procedure continues until the word SMELL in the magnetic drum 52 is gated into the register 53. Comparator 54 then indicates that the counterpart of the trial word has been detected in the magnetic drum 52. Since the reference words are in order of probability, dictionary search time is minimized.

When SMELL is in the register 53, its probability factor is multiplied in multiplier 66 by the trial word priority from register 47. In this case, the multiplication is $1\times.2$ which yields .2.

Comparator 68 then compares the priority weighted probability factor .2 with the probability factor in the output register 70. Since nothing is stored in the output register 70, the comparator indicates that the factor .2 is greater than zero. AND gate 72 then receives a signal from both comparator 54 and 68 and being positively conditioned, the AND gate 72 generates an output pulse which gates the word SMELL into the output register 70 along with its priority weighted probability factor .2.

While the comparator 68 has been deciding whether to gate SMELL into the output register 70, the equality signal from comparator 54 is delayed in delay line 82. The delay gives comparator 68 and AND gate 72 time to function before the next trial word and reference words are gated to their registers 36 and 53 respectively. The signal out of delay line 82 is passed by OR gate 84 to preset address counter 64 to the address of the first word in the dictionary. The signal from the delay line 82 is passed by OR gate 86 and AND gate 88 to advance the address in address counter 50. The new address in address counter 50 specifies the next trial word in drum 38.

Reference to the contents of the character word registers and the character priority combination tables shown above indicate that the next trial word formed will be EMELL. This word is loaded into trial word register 36 and comparator 54 proceeds to search through the dictionary drum 52. Each time the comparator 54 indicates the trial word and reference word do not match, the inequality signal is passed to the AND gate 92 to advance address counter 64. Because the word EMELL does not exist in the English language, the address counter 64 will ultimately be advanced to the last address in the dictionary drum 52. When this count in address counter 64 is reached, the counter passes a signal to singleshot 89. Singleshot 89 via OR gate 84 presets counter 64 back to the first address. The same last address signal from singleshot 89 is passed by OR gate 86 and AND gate 88 to advance the address counter 50 to the address of the next trial word.

The next trial word to be loaded into the trial word register 36 would be SWELL. Comparator 54 then begins the search through the drum dictionary 52 and eventually the counterpart reference word SWELL is detected. Comparator 54 then has an equality signal out which is applied to AND gate 72. The inequality signal being nonexistent does not advance address counter 64. The probability factor from reference word register 53 is passed to the multiplier 66 and likewise the word priority factor from priority register 47 is passed to multiplier 66. In this instance, the multiplier multiplies .9 (priority) $\times$ .8 (probability) and arrives at a .7 priority weighted probability factor. This .7 priority weighted probability factor is greater than the .2 factor associated with the word SMELL which is in the output register 70. Accordingly, AND gate 72 is conditioned on and updates the output register 70 with the present counterpart word SWELL and its priority weighted probability factor .7. After a length of time specified by the delay 82, the address counter 64 is preset to the first reference word address and the address counter 50 is advanced one count.

The next trial word loaded into register 36 is SMALL. For SMALL, multiplier 66 multiplies .9 (priority) $\times$ .3 (probability) to obtain a priority weighted probability factor of .27 rounded off to .3. Since the factor .3 is less than the factor .7 stored in the output register 70 for the word SWELL, comparator 68 does not have an output signal. Therefore, AND gate 72 does not have an output signal and the counterpart reference word SMALL is not gated into the output register 70. At the end of the delay period specified by delay 82, the next trial word is generated.

The procedure for generating trial words and searching the dictionary continues until all the possible trial words have been formed from the trial characters. For the trial characters shown, the trial word SWELL has the highest priority weighted probability factor. Accordingly, after all the trial word formation and searching procedures are complete, the output register will still contain the word SWELL and its priority weighted probability factor .7. To stop the trial word formation and searching procedures, address counter 50 has an output signal indicative of the next address after the last trial word address. This signal is inverted by inverter 90 and inhibits AND gates 88 and 92 from advancing address counters 50 and 64 respectively. The output register 70 then holds the word SWELL until the system is again initialized by resetting the output register 70 and presetting address counter 50 to the first trial word address.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for producing a best-guess word from a plurality of trial characters having predetermined relative priorities associated therewith, said apparatus comprising:

(a) register means for storing said trial characters with indications of the relative priority of each said character;

(b) means for generating a predetermined series of trial-word priorities based upon said trial-character priorities;

(c) gating means responsive to said series-generating means and coupled to said register means for accessing said trial characters in predetermined combinations so as to produce a plurality of trial words therefrom;

(d) memory means for storing a plurality of reference words and a plurality of probability factors respectively associated therewith;

(e) comparison means coupled to said memory means and to said gating means for matching said reference words with said trial words;

(f) weighing means coupled to said comparison means and to said series-generating means for modifying the probability factors of said reference words in accordance with the priorities of said matched trial words; and (g) output means coupled to said weighing means for selecting one of said matched reference words as said best-guess word.

2. Apparatus according to claim 1 wherein said series-generating means comprises:

(a) product means for mutliplying said trial-character priorities by a plurality of predetermined factors; and (b) summing means coupled to said product means for adding together the multiplied priorities of said trial-characters to form said trial-word priorities.

3. Apparatus according to claim 2 wherein said output means is adapted to select as said best-guess word that one of said matched reference words having the highest of said modified probability factors.

4. Apparatus according to claim 3 wherein said weighting means comprises means for multiplying said trial-word priorities with respective ones of said reference-word probability factors to produce said modified probability factors.

5. Apparatus according to claim 3 wherein said output means comprises:

(a) output memory means adapted to store a first of said matched reference words and a first modified probability factor associated therewith; and (b) output gating means for replacing said first matched word with a second of said matched reference words and a second modified probability factor associated therewith, when said second modified factor bears a predetermined relation to said first modified factor.

6. Apparatus according to claim 5 wherein said output gating means is adapted to replace said first matched word with said second matched word when said second modified factor exceeds said first modified factor.

7. A method for automatically producing a best-guess word from a plurality of trial characters having predetermined relative priorities associated therewith comprising the steps of:

(a) gating said trial characters in a plurality of combinations according to said priorities so as to generate a plurality of trial words having priorities associated therewith indicative of the priorities of those trial characters respectively contained in said trial words;

(b) accessing a plurality of probability factors respectively associated with a plurality of reference words which are counterparts of said trial words;

(c) combining said probability factors with said trial-word priorities for generating a plurality of weighted probability factors associated with said trial words; and (d) gating out as said best-guess word that trial word whose weighted probability factor bears a predetermined relation to the weighted probability factors of the remaining ones of said trial words.

8. A method according to claim 7 wherein said trial-word priorities are generated by multiplying the priorities of those trial characters contained in respective ones of said trial words by pre-assigned factors, and by adding the products so formed.

9. A method according to claim 8 wherein said weighted probability factors are generated by multiplying said probability factors with corresponding ones of said trial-word priorities.

10. A method according to claim 9 wherein said best-guess word is gated out as that trial word whose weighted probability factor is greater than the probability factors of the remaining ones of said trial words.

11. A method according ot claim 8 wherein said combinations of trial characters are gated sequentially according to decreasing trial-character priorities so as to form trial words whose priorities form a non-increasing function of time.

12. A method according to claim 11 wherein said probability factors are accessed sequentially in non-increasing order of their magnitudes.

References Cited

UNITED STATES PATENTS 3,259,883 7/1966 Rabinow et al. ---- 340—146.3

DARYL W. COOK, Primary Examiner